United States Patent

Gothreaux

[11] Patent Number: 5,928,514
[45] Date of Patent: Jul. 27, 1999

[54] ON BOARD TREATMENT SYSTEM

[75] Inventor: Richard T. Gothreaux, Baton Rouge, La.

[73] Assignee: Sea Sanitizer Internation, L.L.C., Scott, La.

[21] Appl. No.: 09/014,142

[22] Filed: Jan. 27, 1998

Related U.S. Application Data

[63] Continuation-in-part of application No. 08/701,121, Nov. 5, 1996, abandoned.

[51] Int. Cl.[6] .......................................................... C02F 3/06
[52] U.S. Cl. .......................... 210/617; 210/621; 210/150; 210/195.1; 210/241; 210/257.1
[58] Field of Search ..................................... 210/610, 615, 210/617, 618, 621, 150, 151, 195.3, 196, 241, 242.1, 194, 195.1, 257.1, 622

[56] References Cited

U.S. PATENT DOCUMENTS

| | | | |
|---|---|---|---|
| 3,539,507 | 11/1970 | Woodbridge et al. | 210/622 |
| 3,788,476 | 1/1974 | Othmer | 210/194 |
| 3,870,634 | 3/1975 | Humphrey | 210/220 |
| 3,907,673 | 9/1975 | Belk et al. | 210/17 |
| 4,071,445 | 1/1978 | Katayama et al. | 210/23 |
| 4,210,528 | 7/1980 | Coviello et al. | 210/4 |
| 4,391,703 | 7/1983 | Crosby | 210/151 |
| 4,493,895 | 1/1985 | Colaruotolo et al. | 435/262 |
| 4,559,142 | 12/1985 | Morper | 210/607 |
| 4,925,552 | 5/1990 | Bateson et al. | 210/150 |
| 4,999,103 | 3/1991 | Bogart | 210/151 |
| 5,156,742 | 10/1992 | Struewing | 210/195.1 |
| 5,254,253 | 10/1993 | Behmann | 210/607 |
| 5,403,487 | 4/1995 | Lodaya et al. | 210/610 |
| 5,441,631 | 8/1995 | Steynll, Sr. et al. | 210/257.1 |
| 5,480,551 | 1/1996 | Chudoba et al. | 210/616 |
| 5,645,725 | 7/1997 | Zitzelsberger et al. | 210/605 |
| 5,650,070 | 7/1997 | Pollock | 210/612 |
| 5,674,399 | 10/1997 | Davis | 210/621 |

Primary Examiner—Christopher Upton
Attorney, Agent, or Firm—Kean, Miller, et al.; Russel O. Primeaux; Morgan E. Malino

[57] ABSTRACT

An on-board treatment device and method for use on watercraft and other mobile vessels are provided. The system includes a treatment tank which is connected to the head and a bioreactor and a feed pump which are connected to the treatment tank. A macerator pump breaks up solids in the wastewater before the wastewater enters the treatment tank. During a treatment cycle, a head valve prevents any further flow of wastewater from the head into the treatment tank. Also during a treatment cycle, a bioreactor 3-way valve will be set so that the feed pump will flow wastewater from the tank, through the bioreactor, and back into the treatment tank. The bioreactor will include microorganisms which are adapted to the treatment of human waste. When the wastewater has been sufficiently treated, the feed pump will be turned off so that solids in the wastewater can settle out. After the solids have settled out, the feed pump is turned on and the bioreactor 3-way valve is set so that the now treated wastewater is discharged overboard. In a preferred embodiment the bioreactor includes an aerator.

19 Claims, 3 Drawing Sheets

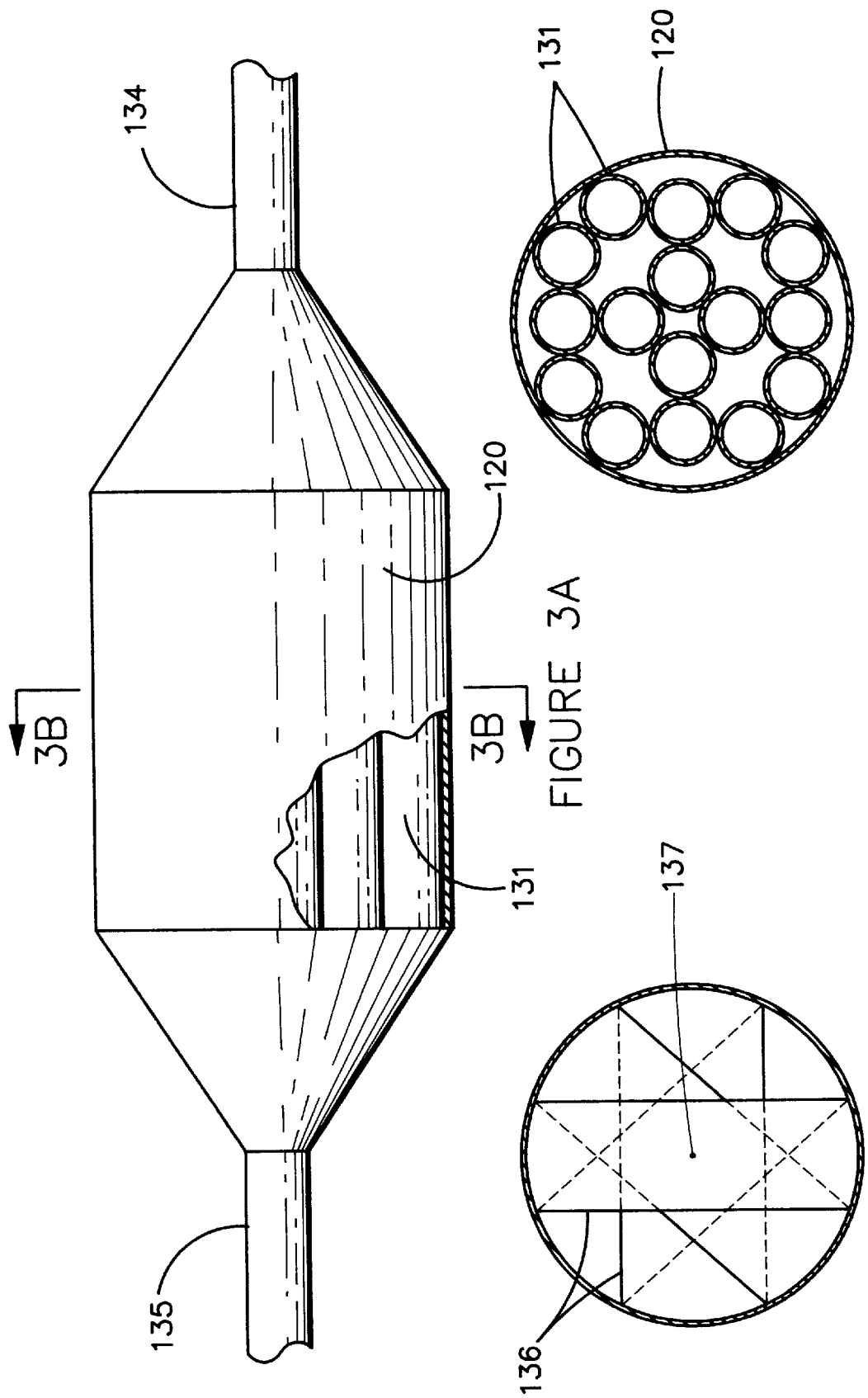

ON BOARD TREATMENT SYSTEM

CROSS-REFERENCE TO RELATED APPLICATION

This is a continuation-in-part of U.S. application Ser. No. #08/701,121 filed on Nov. 5, 1996, now abandoned.

The disclosure of the parent application, U.S. Ser. No. #08/701,121, is hereby incorporated by reference.

BACKGROUND OF THE INVENTION

1. Field of the Invention

This invention relates, generally, to sanitization devices and wastewater treatment systems for use on board mobile vessels, and particularly to such devices and systems for use on boats and ships.

2. Prior Art

Mobile vessels such as motor vehicles, aircraft, and watercraft, especially those of larger size, are often equipped with a toilet. Of late there has been a greater emphasis on treatment of wastewater from these on-board toilets, known as heads. Some regulatory measures have been implemented which severely restrict the bodies of water into which watercraft can discharge untreated wastewater and other types of liquid discharge.

Other regulations allow discharge into certain bodies of water, but the effluent discharged must meet certain treatment standards.

The increased regulation and the desire of watercraft owners and operators to minimize the environmental impact of the discharge from their vessel have led to the development of various Marine Sanitation Devices (MSDs). Current Coast Guard regulations discuss three classes of MSDs. Type I MSDs treat sewage with chemicals or by other means prior to discharging the treated wastewater from the vessel. Type I MSDs must meet certain standards for the discharge and the discharge can have limited visible floating solids. Type II MSDs operate similarly to Type I MSDs but must meet higher treatment standards. A Type III MSD is simply a holding tank.

The disadvantage of having only a holding tank (a Type III MSD) is that the vessel is severely restricted as to where it can discharge the untreated wastewater. Generally, the vessel will have to be on the high seas to discharge the untreated waste or will have the holding tank pumped out. Unauthorized discharges can result in serious penalties for the vessel operator.

Vessels up to and including those 65 feet or greater in length may use Type I, II, or III MSDs. Vessels 66 feet and over must have a Type II or Type III MSD. Because Type II MSDs are typically bigger and more expensive, and because they generally require more power than Type I MSDs, Type II MSDs are not commonly found on vessels 65 feet and smaller.

Type I devices include those which use the salinity of the water and electrical current to make hypochlorous acid (chlorine), which then treats the sewage. These devices require salt water in order to operate. If used in fresh water, such as that found in many inland lakes and streams, the operator must add salt to the device. Other disadvantages of these devices are their bulk and the large amount of power necessary to operate them.

Another Type I MSD is a system in which the wastewater is flowed through a cartridge which contains a solid chlorine tablet. The tablet dissolves as the wastewater is treated. A further disadvantage of the electric current and chlorine cartridge systems discussed above is that they are limited to treating a single "flush" batch at a time. Neither of these Type I MSDs typically has any holding capacity.

Other Type I systems do have the capacity to hold more than one flush. However, the operator must carry and resupply the chemicals necessary for treatment of the wastewater in the tank.

What is needed is a Marine Sanitation Device which overcomes the shortfalls of the devices which are currently known in the art.

OBJECTS OF THE INVENTION

It is an object of the present invention to provide an on-board treatment system which is relatively lightweight.

Another object of the present invention is to provide an on-board treatment system which does not require the operator to continually add chemicals.

Another object of the present invention is to provide an on-board treatment system which uses a minimal amount of power.

Another object of the present invention is to provide an on-board treatment system which has the capability to hold and treat more than one flush at a time.

Another object of the present invention is to provide an on-board treatment system which is simple to operate.

Another object of the present invention is to provide an on-board treatment system which can meet Class II certification standards yet which can be used on vessels smaller than 65 feet in length.

SUMMARY OF THE INVENTION

A device and method for on-board treatment of wastewater are provided. The device includes a treatment tank which is connected to a bioreactor. A pump is included for pumping wastewater through the bioreactor during a treatment cycle. A head controller shuts off the inlet source to the treatment tank during the treatment cycle. A bioreactor controller sets a Y-valve so that the wastewater from the treatment tank is circulated through the bioreactor back into the treatment tank. An aerator provides dissolved oxygen to the bioreactor to promote the growth of microorganisms which degrade the waste.

When the treatment cycle is complete, the bioreactor controller will direct the now treated wastewater through the bioreactor out to an overboard discharge line. Once the now treated wastewater is emptied from the treatment tank, the inlet for the tank is opened and new wastewater can now be received into the treatment tank.

An advantage of the invention is that it uses very little power.

A further advantage of the invention is that it uses relatively little space as compared with other treatment systems.

A further advantage of the invention is that it does not require the continuous addition of chemicals.

A feature of the invention is that it can be easily retrofitted with existing holding tanks because it can use the existing holding tank as the treatment tank.

These and other objects, advantages, and features of this invention will be apparent from the following description.

BRIEF DESCRIPTION OF THE DRAWINGS

FIGS. 3A and 3B depict an embodiment of a treatment filter used in the invention.

DETAILED DESCRIPTION OF THE PREFERRED EMBODIMENTS

Figure 1:
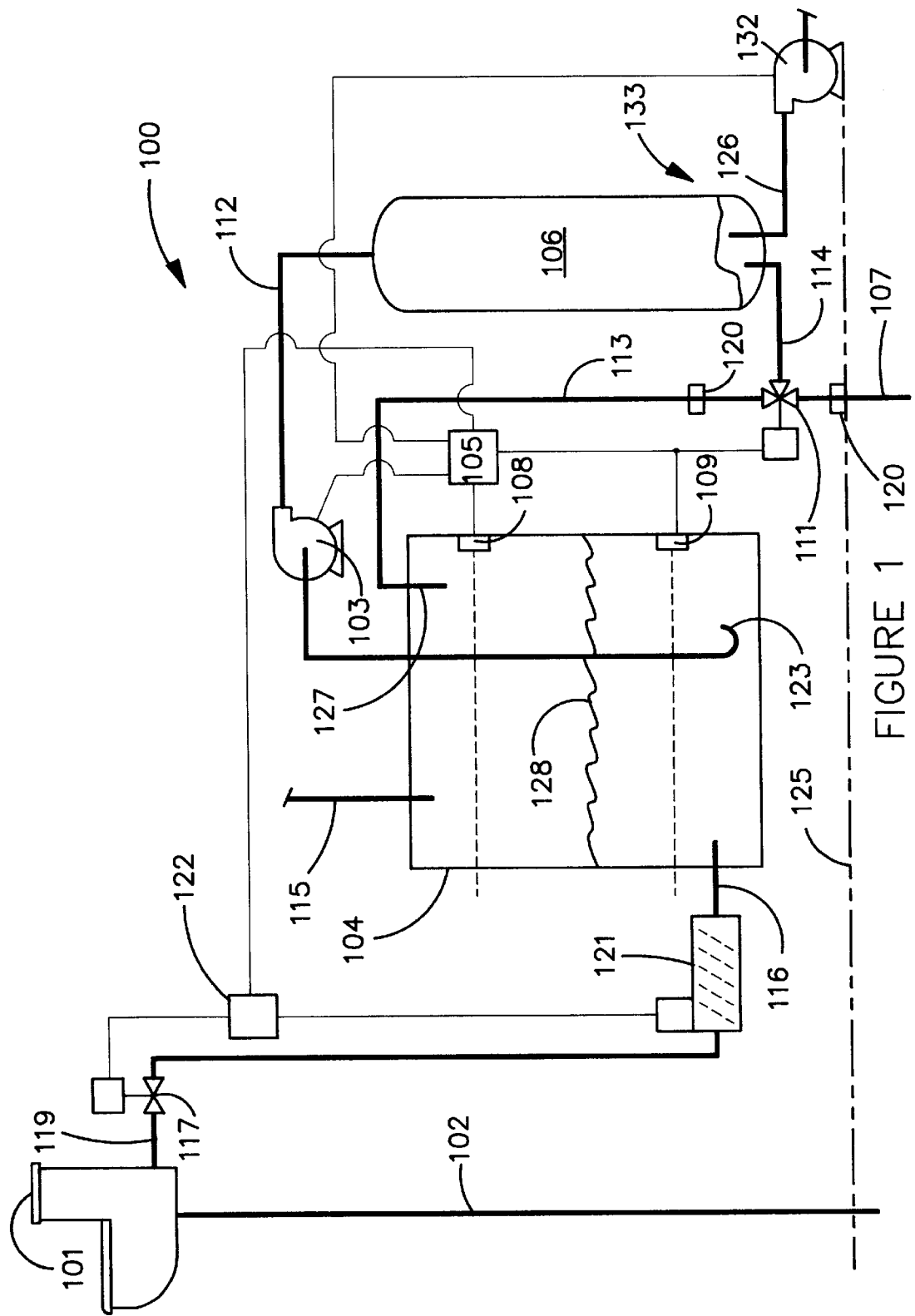
FIG. 1 is a plan view of a preferred embodiment of the invention installed in a watercraft.

With reference to FIG. 1, a preferred embodiment of the treatment system 100 will now be described. Treatment system 100 includes head 101, treatment tank 104, bioreactor controller 105, feed pump 103, air pump 132, and bioreactor 106. The operation of the device and the accompanying method will now be described. Although throughout this description reference will be made to the device's use in watercraft, it is to be understood that the device can be used in any mobile craft such as motor homes, campers, and aircraft.

Wastewater is generated by the occupants of the vessel at head 101. The term wastewater, as used herein, is water which includes human waste. There may also be other sources of wastewater such as a second head. Typically, head 101 will obtain seawater for flushing via seawater intake line 102. From head 101 the wastewater flows through head outlet line 119 to head valve 117. Head valve 117 can be manually controlled or preferably can be controlled by head controller 122. Upon receipt of an appropriate power signal from head controller 122, head valve 117 will allow the wastewater from head 101 to flow into treatment tank inlet line 116. Head controller 122 is also operably connected to bioreactor controller 105. One could also have a device which does not use head controller 122, but instead uses only a manually controlled head valve 117.

Macerator pump 121 is located intermediate head 101 and treatment tank 104 and is used both to flow wastewater into treatment tank 104 and to break up the solids contained in the wastewater prior to treatment. Alternatively, macerator pump 121 could also be placed intermediate head 101 and head valve 117. Wastewater enters treatment tank 104 via treatment tank inlet line 116 until treatment tank 104 has reached a predetermined level or until the operator determines that a treatment cycle should be run. When a treatment cycle is run, whether initiated automatically by the system or manually by the operator, head controller 122 (or the operator in manual operation) will set head valve 117 so as to stop the flow of wastewater into treatment tank inlet line 116. Preferably, head controller 122 is also operably connected to macerator 121 and will keep macerator pump 121 from operating during a treatment cycle. Alternatively, one could simply manually control macerator pump 121 and not operate it during a treatment cycle.

Treatment tank 104 can be a conventional holding tank such as that found on most intermediate sized (20–65 feet) vessels. In the embodiment depicted holding tank 104 is made of fiberglass, plastic, or nylon and is typically box-shaped; but various materials and shapes could be used by those skilled in the art. Preferably, treatment tank 104 is constructed of rotationally molded seamless polyethylene with a minimum wall thickness of at least ¼ inch (for small tanks with a capacity of 10–15 gallons). Treatment tank 104 should be made from linear, not cross-linked polyethylene. Wall thickness should increase proportionately with the size of the tank walls. For example, a 30-gallon tank should have a wall thickness of 0.375 inches. Otherwise, if the wall thickness is not increased with size, the tank walls will be too weak to support the additional weight of the wastewater contained therein. Holding tank 104 will also include vent 115 which prevents pressure buildup and allows gases to escape to the atmosphere.

Wastewater is flowed from holding tank 104 to bioreactor 106 through bioreactor feed line 112. Preferably tank pickup 123 of bioreactor feed line 112 will be J-shaped so that solids which have settled on the bottom of treatment tank 104 are not pulled into bioreactor feed line 112. Feed pump 103 is used to flow the wastewater into bioreactor 106. Although in the embodiment depicted, feed pump 103 is place along bioreactor feed line 112, one could also place feed pump 103 along bioreactor discharge line 114.

Bioreactor 106 is a sealed vessel which can withstand moderate pressure. Bioreactor 106 can have a vertical, horizontal, or angular orientation. In a preferred embodiment, bioreactor 106 is prepackaged so as to include microorganisms which are appropriate for the breakdown of wastewater. In a particularly preferred embodiment bioreactor 106 will include bed material 124. Bed material 124 prevents the microorganisms which have degraded the bacteria in the wastewater from being completely depleted when the treated wastewater is discharged from holding tank 104.

To promote the growth of aerobic organisms, and thus the quicker treatment of the wastewater, bioreactor 106 will preferably include aerating means 133. In the embodiment depicted aerating means 133 includes at least one aerator 126 connected to air pump 132. Air pump 132 is operably connected to bioreactor controller 106 so that bioreactor controller 106 can start the aeration at the beginning of the treatment cycle.

One skilled in the art could use any of several air delivery systems as aerating means 132. Such other means include but are not limited to the use of chemicals which are in an oxidized state, a pump which uses elemental oxygen, rotating brushes or beaters inside treatment tank 104, or a feed pump 103 which aerates while pumping. Although it is not preferred, one could choose not to aerate and simply use the residual DO in the wastewater.

Wastewater leaves bioreactor 106 through bioreactor discharge line 114 and enters bioreactor "Y" valve 111. Bioreactor "Y" valve is operably connected to bioreactor controller 105. Upon receipt of the appropriate signal from bioreactor controller 105, bioreactor "Y" valve 111 will direct the flow of wastewater from bioreactor discharge line 114 to either overboard discharge line 107 or recycle line 113. In a particulary preferred embodiment treatment filter 120 will be included recycle line 113. In addition to or instead of the treatment filter 120 placed along recycle line 113, one could also employ a treatment filter 120 along overboard discharge line 107.

Although in the embodiment depicted overboard discharge line 107 is connected to bioreactor discharge line 114, one skilled in the art could have overboard discharge line connected to treatment tank 104. In such an embodiment, one could use another pump or gravity to drain the treated wastewater from treatment tank 104.

Preferably, recycle line discharge end 127 is located in the upper section of treatment tank 104 so that more complete circulation and treatment can be achieved in holding tank 104. In a preferred embodiment treatment tank 104 will include high level sensor 108 and low level sensor 109.

The operation of the on-board treatment system will now be described. Wastewater enters treatment tank 104 via treatment tank inlet line 116 until water level 128 is high enough to reach high level sensor 108, at which time high level sensor 108 will send a signal to bioreactor controller 105 and head controller 122 to begin a treatment cycle. Upon receipt of such a signal, head controller 122 will stop all flow from head 101 to treatment tank inlet line 116 and, in a preferred embodiment, disable macerator pump 121 so that persons using head 101 cannot operate macerator pump 121.

Bioreactor controller 105, upon receipt of a signal to begin a treatment cycle, will set bioreactor "Y" valve 111 so that wastewater from bioreactor 106 flows back into treatment tank 104 via recycle line 113 and no wastewater flows out of overboard discharge line 107. As the wastewater flows into bioreactor 106, the microorganisms present in bioreactor 106 will use the waste as a nutrient. Some of the microorganisms will also move out of bioreactor 106 and into treatment tank 104 so that treatment tank 104, which previously served only as a holding tank prior to the treatment cycle, will now be a tank in which treatment is taking place. As the water flows out of bioreactor 106 it will also flow through treatment filter 120 which is placed along recycle line 113.

At the start of the treatment cycle bioreactor controller 105 will also turn on aerating means 133. For the particular aerating means 133 depicted in FIGS. 1 and 2, this means that bioreactor reactor controller 105 will turn on air pump 132. Air pump 132 will then force air through aerator 126 into bioreactor 106.

The treatment cycle will continue until the wastewater is treated to the desired standards. This can be done by having the cycle last a certain time period or by the use of sensors or manual testing to ascertain the condition of the wastewater. In the embodiment depicted in FIGS. 1 and 2, a timer is used and is included in bioreactor controller 106. Alternatively, the operator could time the cycle and bioreactor controller 106 and head controller 122 could be manually controlled by the operator.

The time period during which the wastewater is circulated via bioreactor 106 back into treatment tank 104 shall be referred to as the circulating period. In a preferred embodiment of the method described herein, the treatment cycle will include not only this circulating period, but also a settling period. During this settling period the settings for head valve and bioreactor "Y" valve shall remain the same as during the circulating period; however, feed pump 103 and aerating means 133 will be off. This settling period will allow solids suspended in the holding tank to settle out.

Regardless of the method used to determine the length of total treatment cycle, when the treatment cycle is complete bioreactor controller 105 will set bioreactor "Y" valve 111 so that wastewater from bioreactor 106 flows out of overboard discharge line 107 and no wastewater flows back into treatment tank 104 via recycle line 113. As discussed earlier, even though the wastewater was circulated through a treatment filter 120 during the circulating period, one could also flow the treated wastewater through a treatment filter 120 placed along overboard discharge line 107.

In the embodiment depicted, the treated wastewater will flow out of treatment tank 104 until water level 128 is even with low level sensor 109, at which time low level sensor 109 will send a signal to bioreactor controller 106. Alternatively, the operator could manually send the appropriate signal to bioreactor controller via a simple switch upon detection (e.g. by a change in the noise from feed pump 103) of the emptying of treatment tank 104. A substantial portion of the treated wastewater will be pumped from treatment tank 104 but some residual treated wastewater will remain in both treatment tank 104 and bioreactor 106.

Upon receipt of the appropriate signal, bioreactor controller 105 will reset bioreactor "Y" valve 111 so that wastewater from bioreactor 106 flows through treatment filter 120 back into treatment tank 104 via recycle line 113 and no wastewater flows out of overboard discharge line 107. Head controller 122, which is operably connected to bioreactor controller 105, will set head valve 117 so that wastewater from head 101 can once again flow into treatment tank 104 via macerator pump 121 and treatment tank inlet line 116. Head controller 122 will also allow macerator pump 121 to operate once again.

A particular embodiment of the on-board treatment system which was built and tested will now be described. The dimensions and specifications given herein are intended only to enable the invention and are not intended to limit the scope of the invention.

Treatment tank 104 was a 13 gallon molded plastic tank. Most watercraft in the 65 feet and under category will have holding tanks with a capacity of between 10–35 gallons. The invention will work with any size capacity holding tank which is used as the treatment tank; however, one may need to adjust the size of bioreactor 106 or the length of the treatment cycle. All of the lines used, including but not limited to: overboard discharge line 107, bioreactor feed line 112, recycle line 113, bioreactor discharge line 114, treatment tank inlet line 116, and head outlet line 119 were made of ¾ inch I.D. nylon reinforced clear polypropylene hose. Schedule 80 or 40 PVC pipe could also be used but hoses are preferred to prevent breakage.

Feed pump 103 was a diaphragm waste pump which pumped at the rate of 1 gallon per minute (g.p.m.) when connected to a 12 VDC power supply, commercially available through ITT Jabsco as Model No. 59090-0024. Head valve 117 was the standard head valve which came as original equipment on the vessel. Bioreactor "Y" valve 111 was a 3 way valve commercially available from Bi-Torq as Model No. IP3-07SD-E, with accompanying Bi-Torq controller SD4D-S. Wastewater containing sewage was flowed into treatment tank 104. The device was operated at temperatures ranging from 8° C. to 30° C. The circulating period was 60 minutes and the settling period was 15 minutes; resulting in a total treatment cycle time period of 75 minutes.

Figure 2:
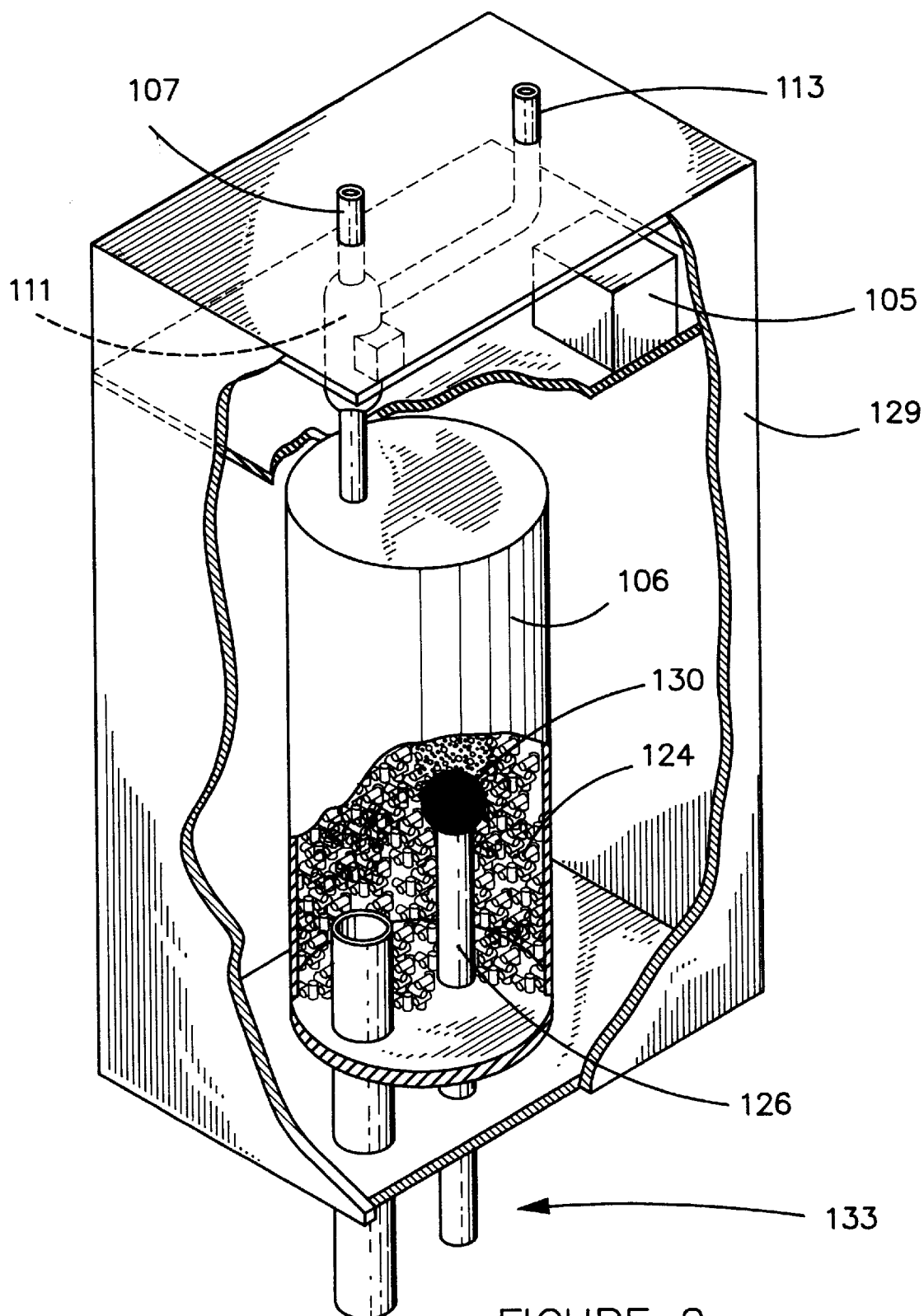
FIG. 2 is a perspective view of a preferred embodiment of the bioreactor cabinet used in the invention.

FIG. 2 is a plan view of an embodiment of bioreactor 106, bioreactor "Y" valve 111, and bioreactor controller 105. These components are housed in a single bioreactor cabinet 129 which is a plastic or fiberglass box which is approximately 25 inches long, 11 inches wide, and 6 inches deep.

Bioreactor 106 is a flexible, rigid, or semi-rigid container which can withstand moderate pressures. In the embodiment tested bioreactor 106 was an 8 liter vinyl bag with a thickness of 20 mils. In the embodiment depicted in FIGS. 1 and 2, bed material 124 is a pelletized material roughly cylindrical in shape. Each cylindrical pellet is approximately 2 mm long and 2 mm in diameter. Suitable bed materials which are commercially available include WR Grace R101 extruded olay and Celite R633/635 extruded diatomaceous earth.

All electromechanical devices used in treatment system 100, such as pumps and controllers, should be adapted for operation in a marine environment, which is typically a 12 VDC negative ground system. Those skilled in the art can adapt components to operate with different power sources.

Bioreactor cabinet 129 can be located in a number of locations on the vessel; the only limitation being that bioreactor cabinet 129 must be fluidly connected to holding tank 104 and to a through hull discharge. Aerator 126 can include an air stone 130 which will help promote the diffusion of the air and thus increase the dissolved oxygen (DO) content of the wastewater. Many air pumps (not shown) can be used to supply air to aerator 126; in the embodiment depicted air pump 132 supplied air at a rate of 6–12 Standard Cubic Feet (SCF)/hour. It is preferable that the DO in bioreactor 106 be maintained at 4.5–5.5 mg/l during the circulation period.

The microorganisms used are preinnoculated in bioreactor 106. Preinnoculating will prevent the need for the operator to supply new microorganisms for each treatment cycle, as is required in chemical systems. Any microorganisms which are suitable for activated sludge processes may be used.

Treatment filter 120 will provide additional treatment by lowering the bacterial levels of the treated wastewater. Any filter which is suitable for decreasing the count of the fecal coliform bacteria may be used. As shown in FIGS. 3A and 3B, treatment filter 120 is a cylindrical cartridge with a volume of approximately 1 liter, however, those skilled in the art can vary the volume of the filter. Treatment filter includes filter inlet 134 and filter outlet 135. Within treatment filter 120 are a plurality of parallel conduits 131.

In the embodiment depicted, each conduit 131 is a section of copper tubing 200 mm in length with an I.D. of 3 mm. 16 such sections are included. It is preferable to use an element such as copper for conduits 131 because copper is toxic to fecal coliform bacteria. One skilled in the art could use other compounds or elements to construct conduits 131 so long that the element or compound was toxic to fecal coliform bacteria. As shown in FIGS. 3A and 3B, the treated wastewater will flow both over the inner and outer surfaces of conduits 131. Other configurations of treatment filter 120 can be used, so long as they maximize the copper surface area with which the treated wastewater can come in contact as it passes through treatment filter 120.

An alternative embodiment of treatment filter 120 is shown in FIG. 3C. In this embodiment treatment filter 120 will include a plurality of flat copper plates 136 which are fixably mounted along rod 137. Each plate 136 is approximately ⅛" thick and there is a ¼" space between each plate.

Each adjacent plate is oriented at a 45° rotation from the immediately adjacent plates, so that a spiral configuration of plates 136 is created along rod 137. This configuration will maximize the contact between the waste water and copper plates 136.

Testing of the system indicated that the system is capable of reducing the effluent to acceptable treatment levels. The influent wastewater brought into treatment tank 104 had a fecal coliform bacteria count of $10^7$ cfu and the total suspended solids (TSS) were 60–70 mg/l. After treatment with a 60 minute circulation period and a 15 minute settling period, the treated wastewater discharged from bioreactor 106 had a fecal coliform bacteria count of 10–20 cfu/liter and TSS of less than 2 mg/l. These effluent counts were achieved with an embodiment of the invention which did not include treatment filter 120.

Watercraft which currently have Type I MSDs (holding tank) will typically already have head 101, head valve 117, macerator pump 121, and treatment tank 104. For these existing vessels, it is envisioned that the components necessary to complete treatment system 100 can be packaged, sold, and installed as a kit. The kit would include those components of treatment system necessary to complete the on-board treatment system previously described. The existing holding tank will function as, and will be referred to, treatment tank 104.

In the embodiments described above, head 101 cannot be flushed during a treatment cycle. This may cause inconvenience to occupants of the vessel. In another embodiment an entirely separate intermediate holding tank (not shown) could be place intermediate head 101 and treatment tank 104. This intermediate holding tank would allow occupants of the vessel to continue to use and flush head 101, even during a treatment cycle.

There are of course other alternate embodiments which are obvious from the foregoing descriptions of the invention, which are intended to be included within the scope of the invention, as defined by the following claims.

I claim:

1. An on-board treatment system comprising:
   (1) a treatment tank, said treatment tank being fluidly connected to a wastewater source;
   (2) a head valve for controlling the flow of wastewater from said wastewater source into said treatment tank;
   (3) a macerator pump intermediate said wastewater source and said treatment tank;
   (4) a bioreactor fluidly connected to said treatment tank;
   (5) a bioreactor "Y" valve for directing wastewater from said bioreactor back into said treatment tank or to an overboard discharge line;
   (6) a bioreactor controller for controlling said bioreactor "Y" valve; and
   (7) a feed pump for flowing wastewater from said treatment tank to said bioreactor.

2. The on-board treatment system in claim 1, further comprising a head controller for controlling said head valve, said bioreactor controller and said macerator pump.

3. The on-board treatment system in claim 2, wherein said bioreactor further comprises:
   (1) bed material; and
   (2) an aerating means.

4. The on-board treatment system in claim 2, wherein said bioreactor further comprises microorganisms which are preinnoculated in said bioreactor, said microorganisms being adapted to use human waste as a nutrient.

5. The on-board treatment system in claim 4, further comprising a treatment filter fluidly connected to said bioreactor and said treatment tank.

6. The on-board treatment system in claim 5, wherein said treatment filter further comprises:
   (1) a cartridge having an inlet and an outlet;
   (2) a plurality of parallel conduits contained within said cartridge, and
   (3) wherein said cartridge and said conduits are made of a material which is toxic to fecal coliform bacteria.

7. The on-board treatment system in claim 2, wherein said treatment tank further comprises: a high level sensor and a low level sensor, said high and low level sensors being operably connected to said bioreactor controller and said head controller.

8. The on-board treatment system in claim 1, wherein said bioreactor further comprises:
   (1) bed material; and
   (2) an aerating means.

9. The on-board treatment system in claim 1, wherein said bioreactor further comprises microorganisms which are preinnoculated in said bioreactor, said microorganisms being adapted to use human waste as a nutrient.

10. The on-board treatment system in claim 1, wherein bioreactor controller further comprises a timer, said timer being adapted to control the function of said feed pump and said bioreactor "Y" valve based on the passage of a certain period of time.

11. A kit for the conversion of an on-board holding tank system having a head, a head valve, a macerator pump, and a holding tank, said holding tank to be used as a treatment tank; said kit comprising:

(1) a head controller for controlling said head valve;

(2) a bioreactor adapted for connection to said treatment tank;

(3) a bioreactor "Y" valve for directing wastewater from said bioreactor back into said treatment tank or to an overboard discharge line;

(4) a bioreactor controller for controlling said bioreactor "Y" valve, said bioreactor controller being adapted so as to be operably connected to said head controller; and (5) a feed pump adapted for flowing wastewater from said treatment tank to said bioreactor.

12. The kit in claim 11, wherein said bioreactor further comprises:

(1) bed material; and (2) an aerating means.

13. The kit in claim 12, wherein said bioreactor further comprises microorganisms which are preinnoculated in said bioreactor, said microorganisms being adapted to the treatment of human waste.

14. The kit in claim 12, wherein bioreactor controller further comprises a timer, said timer being adapted to control the function of said feed pump and said bioreactor "Y" valve based on the passage of a certain period of time.

15. The kit in claim 11, wherein said bioreactor further comprises microorganisms which are preinnoculated in said bioreactor, said microorganisms being adapted to use human waste as a nutrient.

16. The kit in claim 11, wherein bioreactor controller further comprises a timer, said timer being adapted to control the function of said feed pump and said bioreactor "Y" valve based on the passage of a certain period of time.

17. A method of treating waste on watercraft or other mobile vessels, said method comprising:

(1) providing a device for the treatment of waste, said device comprising:

(a) a treatment tank, said treatment tank being fluidly connected to a wastewater source;

(b) a head valve for controlling the flow of wastewater from said wastewater source into said treatment tank;

(c) a head controller for controlling said head valve;

(d) a bioreactor fluidly connected to said treatment tank;

(e) a bioreactor a "Y" valve for directing wastewater from said bioreactor back into said treatment tank or to an overboard discharge line;

(f) a bioreactor controller for controlling said bioreactor "Y" valve, said bioreactor controller being operably connected to said head controller; and (g) a feed pump for flowing wastewater from said treatment tank to said bioreactor;

(2) initiating a circulation period in said system by setting said head valve so that wastewater from said wastewater source cannot flow to said treatment tank, setting said bioreactor "Y" valve so that wastewater from said bioreactor is circulated back into said treatment tank, and turning said feed pump on;

(3) continuing said circulation period by circulating said wastewater through said bioreactor back into said treatment tank until the desired treatment requirements for said wastewater are achieved;

(4) ending said circulation period and initiating a settling period by turning off said feed pump;

(5) ending said settling period by turning on said feed pump and setting said bioreactor "Y" valve so that wastewater from said bioreactor is flowed to said overboard discharge line until a portion of said wastewater in said treatment tank has been discharged;

(6) turning said feed pump off and setting said bioreactor "Y" valve so that wastewater from said bioreactor cannot flow to said overboard discharge line; and (7) setting said head valve so that wastewater from said wastewater source can flow to said treatment tank.

18. The method in claim 17, wherein:

(1) said bioreactor further comprises an aerating means; and (2) said aerating means is operated during said circulation period.

19. The method in claim 17, wherein:

(1) said bioreactor controller of said device provided in step (1) of claim 13 further comprises a timer, said timer being adapted to control the function of said feed pump and said bioreactor "Y" valve based on the passage of a certain period of time; and (2) the length of said circulation period and said settling period are determined by said timer.

* * * * *